US012647357B2

(12) United States Patent
Chritz et al.

(10) Patent No.: US 12,647,357 B2
(45) Date of Patent: Jun. 2, 2026

(54) ATTESTATION LOGIC ON MEMORY FOR MEMORY DIE VERIFICATION

(71) Applicant: MICRON TECHNOLOGY, INC., Boise, ID (US)

(72) Inventors: Jeremy Chritz, Seattle, WA (US); David Hulton, Seattle, WA (US); Tamara Schmitz, Scotts Valley, CA (US)

(73) Assignee: Micron Technology, Inc., Boise, ID (US)

( * ) Notice: Subject to any disclaimer, the term of this patent is extended or adjusted under 35 U.S.C. 154(b) by 515 days.

(21) Appl. No.: 18/068,419

(22) Filed: Dec. 19, 2022

(65) Prior Publication Data

US 2023/0119361 A1 Apr. 20, 2023

Related U.S. Application Data

(60) Provisional application No. 63/266,020, filed on Dec. 27, 2021.

(51) Int. Cl.
H04L 45/00 (2022.01)
G06F 7/58 (2006.01)
(Continued)

(52) U.S. Cl.
CPC .............. H04L 45/72 (2013.01); G06F 7/588 (2013.01); G06F 9/45558 (2013.01);
(Continued)

(58) Field of Classification Search
CPC ........ H03K 19/17792; H03K 19/17744; H04L 45/72; H04L 67/568; H04L 63/08;
(Continued)

(56) References Cited

U.S. PATENT DOCUMENTS 6,917,380 B1 * 7/2005 Tay ......................... H04N 25/68
348/E5.081
8,656,482 B1 * 2/2014 Tosa .................... G06F 9/45558
713/153
(Continued)

OTHER PUBLICATIONS

Kameleon, Yigal E. et al. "Attestation of System Components v1.0 Requirements and Recommendations", Open Compute Project IBM Corporation, Nov. 4, 2020, pp. 1-38.

*Primary Examiner* — Kyung H Shin
(74) *Attorney, Agent, or Firm* — Dorsey & Whitney LLP

(57) ABSTRACT

Examples described herein provide for attestation of memory dies using a respective memory identifier of the memory die itself. A memory device may include a memory die with a memory array, attestation logic, and programmable circuitry that stores a memory identifier associated with the memory array. The attestation logic may generate an encryption key pair based on the memory identifier stored in the programmable circuitry. Advantageously, by attesting memory die using a memory identifier stored in programmable circuitry, examples of systems and methods described herein may provide increased security for data processed by memory die. For example, a non-attested or compromised memory die may be remediated. The attestation of memory dies may include attestation of memory dies on wireless devices, drones, vehicles, and/or Internet-of-Things devices.

23 Claims, 6 Drawing Sheets

(51) Int. Cl.

| | |
|---|---|
| *G06F 9/455* | (2018.01) |
| *H03K 19/17768* | (2020.01) |
| *H03K 19/17792* | (2020.01) |
| *H04L 9/08* | (2006.01) |
| *H04L 9/32* | (2006.01) |
| *H04L 9/40* | (2022.01) |
| *H04N 25/68* | (2023.01) |

(52) U.S. Cl.

CPC . *H03K 19/17768* (2013.01); *H03K 19/17792* (2013.01); *H04L 9/0825* (2013.01); *H04L 9/3247* (2013.01); *H04L 9/3263* (2013.01); *H04L 63/06* (2013.01); *H04N 25/68* (2023.01)

(58) Field of Classification Search

CPC ..... H04L 63/20; H04L 63/123; H04L 63/105; H04L 63/06; H04L 9/0891; H04L 9/0822; H04L 63/0435; H04L 63/0442; H04L 9/3247; H04L 9/088; H04L 63/102; H04L 9/3242; H04L 9/3263; G06F 8/60; G06F 12/1408; G06F 12/1027; G06F 21/51; G06F 21/52; G06F 21/572; G06F 9/45558; G06F 21/53; G06F 21/606; G06F 21/60; H04N 25/68; H01L 25/18; H04W 4/50

See application file for complete search history.

(56) References Cited

U.S. PATENT DOCUMENTS

| | | | | |
|---|---|---|---|---|
| 9,674,162 B1* | 6/2017 | Miller | ..................... | H04L 63/06 |
| 9,864,006 B1* | 1/2018 | Erickson | .......... | H03K 19/17792 |
| 2013/0055369 A1* | 2/2013 | Kumar | .................. | H04L 9/3247 |
| | | | | 726/7 |
| 2014/0181458 A1* | 6/2014 | Loh | ......................... | H01L 25/18 |
| | | | | 711/206 |
| 2021/0021609 A1* | 1/2021 | Smith | ..................... | H04L 45/72 |
| 2022/0197599 A1* | 6/2022 | Cambou | ................ | G06F 7/588 |
| 2022/0231839 A1* | 7/2022 | Nelson | ................... | H04L 9/088 |
| 2022/0294644 A1* | 9/2022 | Liu | ....................... | H04L 9/3263 |

* cited by examiner

300

START

302
PROGRAMMING A PROGRAMMABLE CIRCUITRY TO STORE A MEMORY
IDENTIFIER ASSOCIATED WITH A MEMORY ARRAY ON A MEMORY DIE

304
PROVIDING, FROM AN ATTESTATION LOGIC OF THE MEMORY DIE, A PUBLIC
KEY BASED PARTLY ON THE MEMORY IDENTIFIER TO A HOST
COMPUTING DEVICE

306
REGISTERING THE MEMORY ARRAY ON THE MEMORY DIE TO ATTEST THE
MEMORY ARRAY AS A TRUSTED COMPONENT

END

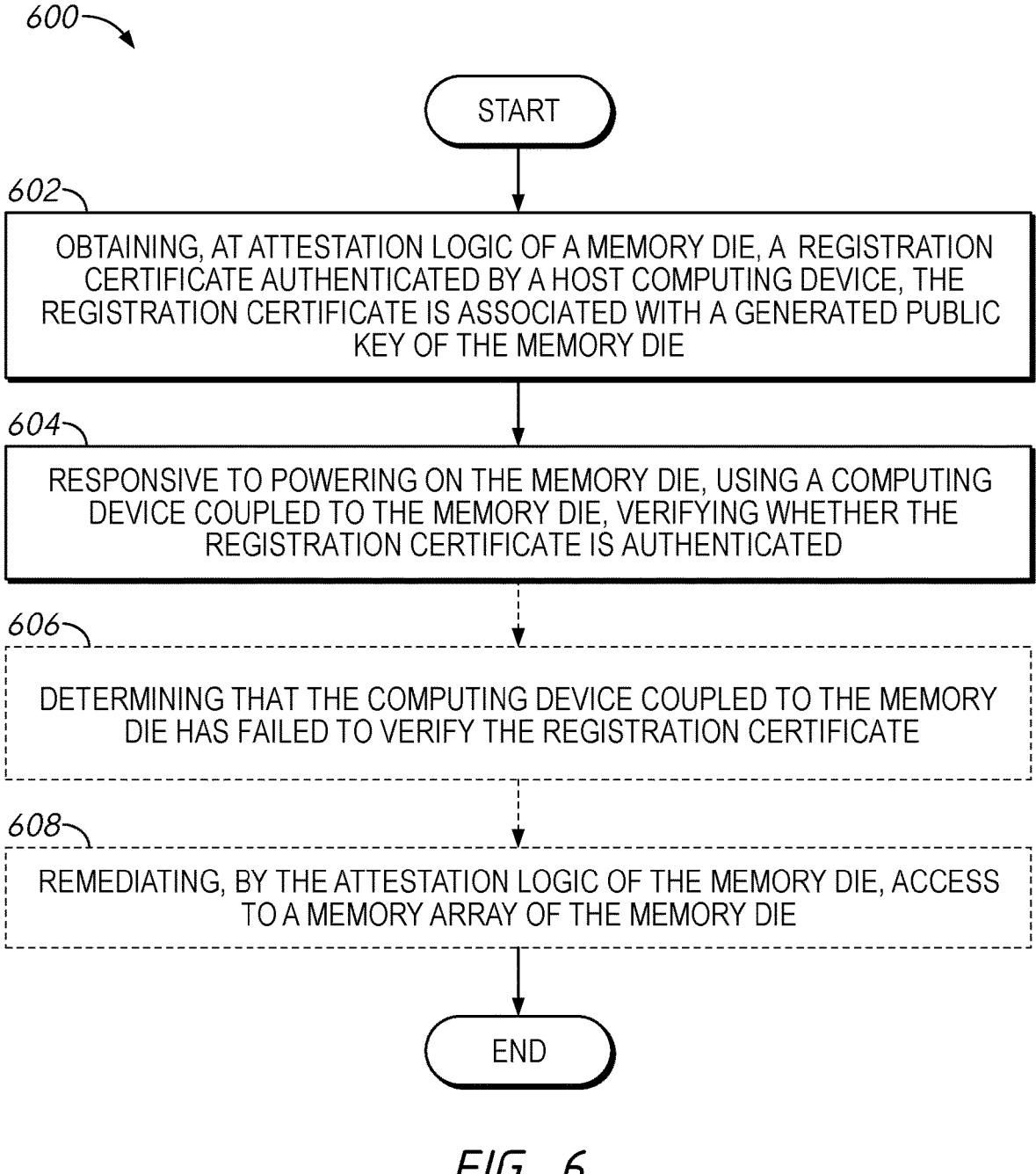

*600*

START

*602*

OBTAINING, AT ATTESTATION LOGIC OF A MEMORY DIE, A REGISTRATION CERTIFICATE AUTHENTICATED BY A HOST COMPUTING DEVICE, THE REGISTRATION CERTIFICATE IS ASSOCIATED WITH A GENERATED PUBLIC KEY OF THE MEMORY DIE

*604*

RESPONSIVE TO POWERING ON THE MEMORY DIE, USING A COMPUTING DEVICE COUPLED TO THE MEMORY DIE, VERIFYING WHETHER THE REGISTRATION CERTIFICATE IS AUTHENTICATED

*606*

DETERMINING THAT THE COMPUTING DEVICE COUPLED TO THE MEMORY DIE HAS FAILED TO VERIFY THE REGISTRATION CERTIFICATE

*608*

REMEDIATING, BY THE ATTESTATION LOGIC OF THE MEMORY DIE, ACCESS TO A MEMORY ARRAY OF THE MEMORY DIE

END

*FIG. 6*

ATTESTATION LOGIC ON MEMORY FOR MEMORY DIE VERIFICATION

CROSS REFERENCE TO RELATED APPLICATION(S)

This application claims priority to U.S. Provisional Application No. 63/266,020 filed Dec. 27, 2021. The aforementioned application is incorporated herein by reference, in its entirety, for any purpose.

BACKGROUND

Networked devices may be attested by a verifier, e.g., to assess the trustworthiness of a networked device. For example, a server may verify a connected networked device through an attestation process to create a root-of-trust (RoT) relationship. The connected networked device that is attested by the verifier may be referred to as an attester device. In the example, the attester device may be attester may be a network interface controller (NIC), redundant array of independent disks (RAID) controller, or non-volatile memory express (NVMe) solid state drive (SSD). Accordingly, attester devices may create RoT relationships with a verifier, like a server or a host computing device using such attestation processes. For example, the Initial Release of Attestation of System Components (v1.) by the Open Compute Project (OCP) describes an attestation process for networked devices.

Moreover, there is an increasing interest in moving wireless communications to "fifth generation" (5G) systems. 5G offers promise of increased speed and ubiquity, but methodologies for processing 5G wireless communications have not yet been set. In some implementations of 5G wireless communications, "Internet of Things" (IoT) devices may operate on a narrowband wireless communication standard, which may be referred to as Narrow Band IoT (NB-IoT). For example, Release 13 of the 3GPP specification describes a narrowband wireless communication standard. Increasingly, IoT devices, wireless devices, and data center servers may be altered, or attempted to be altered, by malicious actors. For example, a malicious actor could alter a drone, which would decrease the trustworthiness of the drone. Accordingly, there is a need for attestation process to move beyond device-specific implementations.

Further, as cellular vehicle-to-everything (C-V2X) communication increases among vehicles (e.g., vehicular wireless communication), bandwidth demand for wireless communications may involve increased memory usage, to facilitate processing of increasingly more vehicular wireless communications signals. Accordingly, vehicular wireless networks (e.g., C-V2X communication) may use memory systems and devices increasingly.

BRIEF DESCRIPTION OF THE DRAWINGS

FIG. 6 is a schematic illustration of a method in accordance with examples described herein.

DETAILED DESCRIPTION

Figure 1:
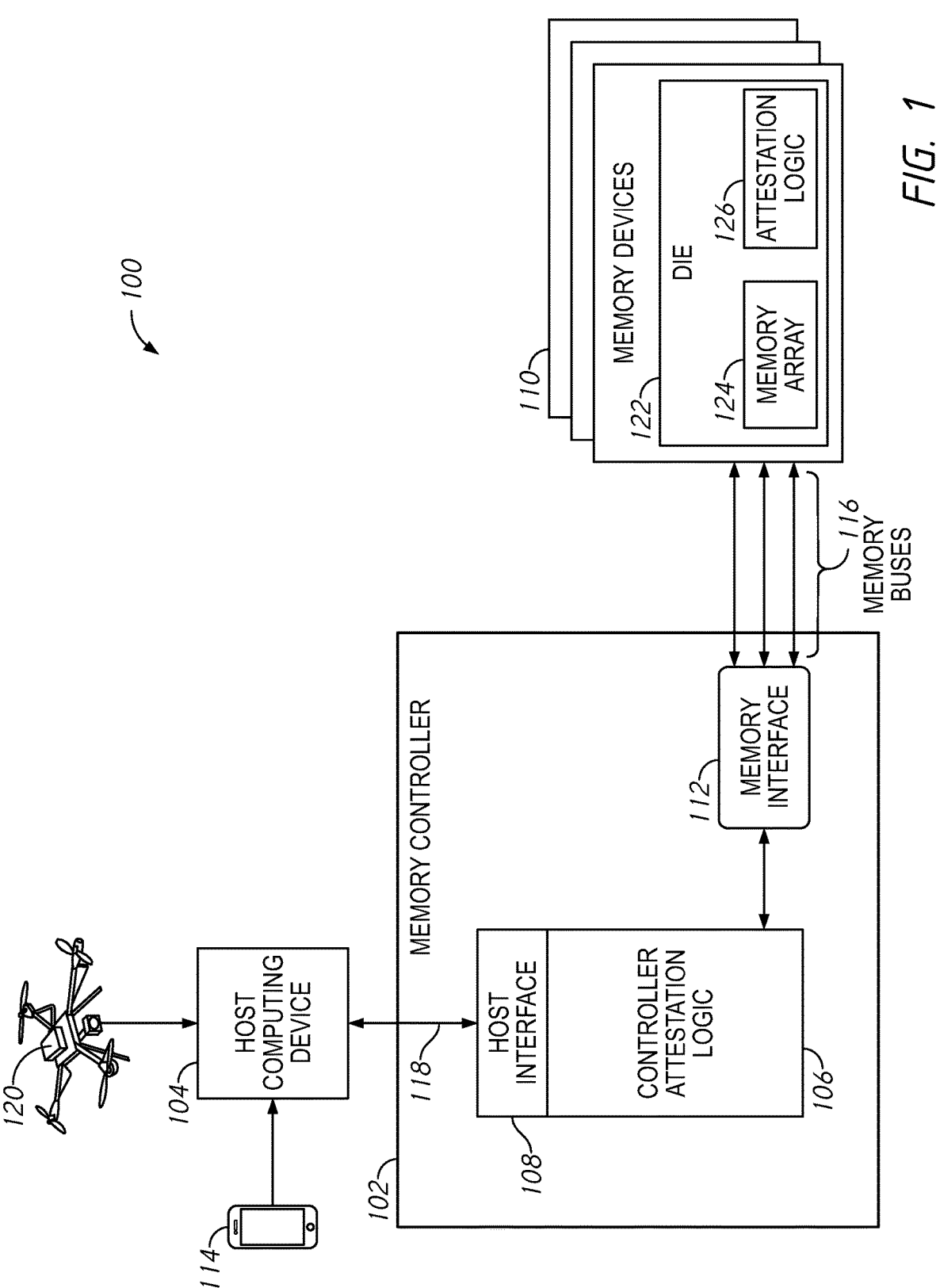
FIG. 1 is a schematic illustration of a system arranged in accordance with examples described herein.

Examples of systems and method described herein provide for attestation of memory dies using a respective memory identifier of the memory die itself. In the examples, a memory die includes a memory array and programmable circuitry that stores a memory identifier associated with the memory array.

Computing devices that regularly access memory devices may do so through a memory controller. For example, a host computing device may generate memory access requests which are routed through a memory controller that controls access to various coupled memory devices, which may be non-volatile or volatile memory devices. Generally, a memory access request can be or include a command and an address, for example, a memory command and a memory address. In various implementations, the memory access request may be or include a command and an address for a read operation, a write operation, an activate operation, or a refresh operation at coupled non-volatile memory devices. Generally, a received command and address may facilitate the performance of memory access operations at coupled memory devices, such as read operations, write operations, activate operations, and/or refresh operations for the coupled memory devices.

It may be complex and cumbersome to secure individual memory dies or individual memory devices.

In examples described herein, a host computing device may interact with the memory device itself to attest the memory die of the memory device, thereby establishing a root-of-trust (RoT) relationship specifically with the memory device. A RoT relationship may be hardware-based root-of-trust, e.g. as defined by the National Institute of Technology (NIST) in Special Publication 800-164. In some examples, a computing device or IoT device, which may include a plurality of memory devices, may include one or more memory dies in those memory devices, and may establish a RoT relationship (e.g., a hardware-based RoT). For example, a host computing device may attest a specific memory die of an IoT device or other device. Advantageously, by attesting specific memory dies using respective memory identifiers—in contrast to, for example, a memory controller alone attesting itself—the systems and methods described herein provide security for individual memory dies. For example, by attesting each memory die using a respective memory identifier, a non-attested or compromised memory die may be remediated, e.g., by debugging the memory die remotely, by monitoring the memory die for malicious actions by a malicious actor (e.g., a hacker accessing the memory die), and/or by preventing or reducing further use of the memory die.

Examples of systems and methods described herein provide for attestation logic integrated onto a memory die with a memory array. While attestation logic has been present on memory controllers (e.g., in Open Compute Project specifications) to authenticate the memory device including the controller and multiple memory arrays, attestation logic has not been provided specifically for an individual memory die having a memory array (e.g., using CMOS under a memory array). Additionally and advantageously, by attesting specific memory dies using respective memory identifiers—in contrast to, for example, a memory controller alone attesting itself—the systems and methods described herein provide for efficient use of memory devices, such that a non-attested memory die may be decommissioned or shut down; while other memory dies, which are individually attested, may continue to be accessed for data storage and retrieval. Accordingly, using memory identifiers for attestation of memory devices by a host computing device may facilitate a more efficient use of memory, which may allow larger datasets to continue to be used on the memory devices, thereby increasing the size of datasets and/or data to be processed/stored on the memory devices. Accordingly, a data center housing various pluralities of memory devices can increase the speed of processing of datasets using the examples of systems and methods described herein.

Additionally and advantageously, in implementation of IoT systems, the systems and methods described herein may allow attestation of memories implemented on IoT devices (e.g., a vehicle, a drone, or a smartphone) so that only those IoT devices with individually-authenticated memory dies can provide data using a secured Root-of-Trust relationship. For example, because individual memories (e.g., individual memory arrays) of an IoT device can attest to their trustworthiness, direct, secure connections can be facilitated to that IoT device with an enterprise network (e.g., a VPN connection). In contrast, in conventional systems that do not support individual memory attestation, a malicious actor could replace a memory and/or data on the memory, in an attempt to gain access to the enterprise network (e.g., the replaced device or data may include malicious code). Accordingly, attestation logic at memory dies may facilitate a secure and RoT connection which may be formed with an enterprise network, for each memory die, such that data may be securely accessed on the IoT device.

FIG. 1 is a schematic illustration of a system 100 arranged in accordance with examples described herein. System 100 includes a host computing device 104 coupled to IoT device 114 (depicted as a mobile phone in FIG. 1) and drone 120. System 100 also includes memory controller 102 coupled to the host computing device 104 via host bus 118. The memory controller 102 includes host interface 108 that couples the host bus 118 between the host computing device 104 and the memory controller 102. The memory controller 102 provides memory access requests from the host computing device 104 to the memory devices 110. The host interface 108 is coupled to controller attestation logic 106. The controller attestation logic 106 is coupled to memory devices 110 via memory interface 112 and respective memory buses 116. The controller attestation logic 106 may attest to the host computing device 104 the trustworthiness of the memory controller 102, e.g., to establish a RoT relationship. Each memory device 110 includes a memory die 122 with a memory array 124 and attestation logic 126. Each attestation logic 126 may attest to the host computing device 104 the trustworthiness of a respective memory die 122 for the respective memory device 110.

In various implementations, the memory controller 102 and the memory devices 110 may communicate via various memory protocols that facilitate processing of memory access requests to the memory devices 110, depending on whether the memory devices 110 are volatile memory devices or non-volatile memory devices. The memory devices 124 may include one or more types of memory, including but not limited to: DRAM, SRAM, TLC NAND, SLC NAND, SSD, or 3D XPoint memory devices. In an example where the memory devices 110 are non-volatile memory devices, the memory controller 102 may be an Non-Volatile Memory Express ("NVMe") memory controller, which is coupled to the host computing device 104 via the host bus 118, e.g., a PCIe bus operating in accordance with an NVMe protocol. In some implementations, the memory devices 110 may be NAND memory devices, which are coupled to the NVMe memory controller 102 via a respective PCIe bus operating in accordance with an NVMe protocol. Accordingly, the memory buses 116 may be referred to as NVMe memory buses. In an example implementation, there may be eight (8) memory devices 110 operating as NAND memory devices and controlled by memory controller 102.

Generally, responsive to one or more memory access requests from the host computing device (e.g., based on data acquired or obtained from drone 120 or IoT device 114), the memory devices 110 may provide access to their respective memory arrays 124, e.g., information stored or to be written to the memory arrays 124. With access available at the memory devices 110, the memory interface 112 is further configured to provide access to the memory devices 110 through the memory buses 116 and the memory controller 102 via host bus 118. Advantageously, in using attestation logic 126, memory devices 110 may attest respective memory dies 122 to provide security for memory access requests, e.g., before responding to memory access requests. In the example, the attestation logic 126 is configured to be initiate upon a boot or power on of the respective memory device 110. Accordingly, at initiation or launch of the memory device 110, the host computing device 104 may attest a respective memory die 122, to register the memory die 122 as a trusted component. In some examples, the launch of the memory device 110 with host computing device 104 may be a logical or virtual launch of the memory device 110; for example, the first time that host computing device 104 interacts or receives a request from a respective memory device 110.

While the above example is described in the context of an NVMe protocol, it can be appreciated that the memory controller 102 and memory devices 110 may also communicate via various additional or alternative memory protocols, e.g., depending on the on whether the memory devices 110 are volatile memory devices or non-volatile memory devices. For example, the memory protocols used over the memory buses 116 may include PCIe, Compute Express Link (CXL), Universal Flash Storage (UFS), embedded Multi Media Controller Protocol (EMMC); or in the case of volatile memory devices, like a DRAM memory device, the host bus 118 may be DRAM bus.

While system 100 depicts one memory controller 102, it can be appreciated that the host computing device 104 may be in communication with several memory controllers 102. For example, one or more memory controllers 102 and corresponding memory devices 110 may be implemented on IoT device 114, which may be a smartphone, or on a drone 120. Accordingly, the drone 120 or IoT device 114 may establish RoT relationships between a host computing device 104 and respective memory dies 122 on their memory devices 110. Advantageously, individually attested memory dies at drone 120 or IoT device 114 may facilitate a secure and RoT connection that is formed with an enterprise network, for each memory die, such that data may be securely accessed on either the drone 120 or the IoT device 114.

Each memory device 110 may also have one or more memory dies, such as memory die 122. The memory die may include one or more memory arrays, such as memory array 124. For example, the memory die 122 may be a semiconductor die that is formed using one or more semiconductor substrates. The attestation logic 126 may be located on a same die as the memory array 124. For example, the attestation logic 126 may be formed in a same semiconductor substrate as the memory array 124. In some examples, the attestation logic 126 may be integrated with the memory array 124 (e.g., using CMOS under the memory array). Generally, the memory arrays, such as memory array 124, refer to a group of memory cells. In example implementations, the attestation logic 126 may include any type of microprocessor, central processing unit (CPU), an application specific integrated circuits (ASIC), a digital signal processor (DSP) implemented as part of a field-programmable gate array (FPGA), a system-on-chip (SoC), or other hardware (e.g., circuitry) to generate key pairs (e.g., a public key and private key) based on a memory identifier associated with the memory array 124. Generally, for an implementation on a memory die 122, the attestation logic 126 may be implemented by one or more logic gates (e.g., OR, AND, NAND, NOR, XOR) on the memory die 122. Accordingly, while attestation logic 126 of a memory die 122 may be implemented by an attestation logic 126 that is a microprocessor coupled to each die 122 of the memory devices 110, attestation logic 126 may also be implemented physically on the die itself using one or more combinations of logic gates of the memory die 122.

The attestation logic 126 may provide a public key to the host computing device 104 using a memory identifier associated with the corresponding memory array 124. To provide a public key to the host computing device 104 as part of an attestation process, the attestation logic 126 is configured to generate a public key and a private key based on the memory identifier associated with the memory array 124. In various implementations, the memory identifier may be a numerical value or a hash stored in programmable circuitry of the memory die 122 (e.g., programmable circuitry 220 of FIG. 2). In an example, the attestation logic 126 may be configured to generate a public key and a private key based on the memory identifier using a Device Identifier Composition Engine (DICE) that the attestation logic 126 implements on the memory die 122. The attestation logic 126 may also be configured to generate a certificate template that includes the public key and may sign the certificate template using the generated private key. The signed certificate template including the public key may be provided to the host computing device 104 by the attestation logic 126 to the host computing device 104. The host computing device 104 may use the signed certificate template including the public key, to register the memory die 122, e.g., as a trusted component of the memory device 110.

Accordingly, in comparison to a memory system which may only attest the memory controller 102 using controller attestation logic 106, the system 100, advantageously, increases the security of the memory system 100, as each memory device 110 having an attestation logic 126 may individually attest its corresponding memory die 122. In examples where a memory die 122 includes a single memory array 124, the attestation logic 126 can be said to have individually attested the memory array 124. Accordingly, while a RoT relationship between the memory controller 102 and the host computing device 104 offers a level of security for data transfer over the memory buses 116, the system 100 increases security for any data transfer over the memory buses 116 because data may be only provided to memory devices 110 that have attested their respective memory die 122 using the memory identifier. In comparison to a memory system where a malicious user may exploit or hack the attestation process of the controller attestation logic 106 (e.g., the generated public key of the controller attestation logic 106 is learned or hacked), the system 100 may provide for additionally established RoT relationships between each memory device 110 having an attestation logic 126 and the host computing device 104.

Figure 2:
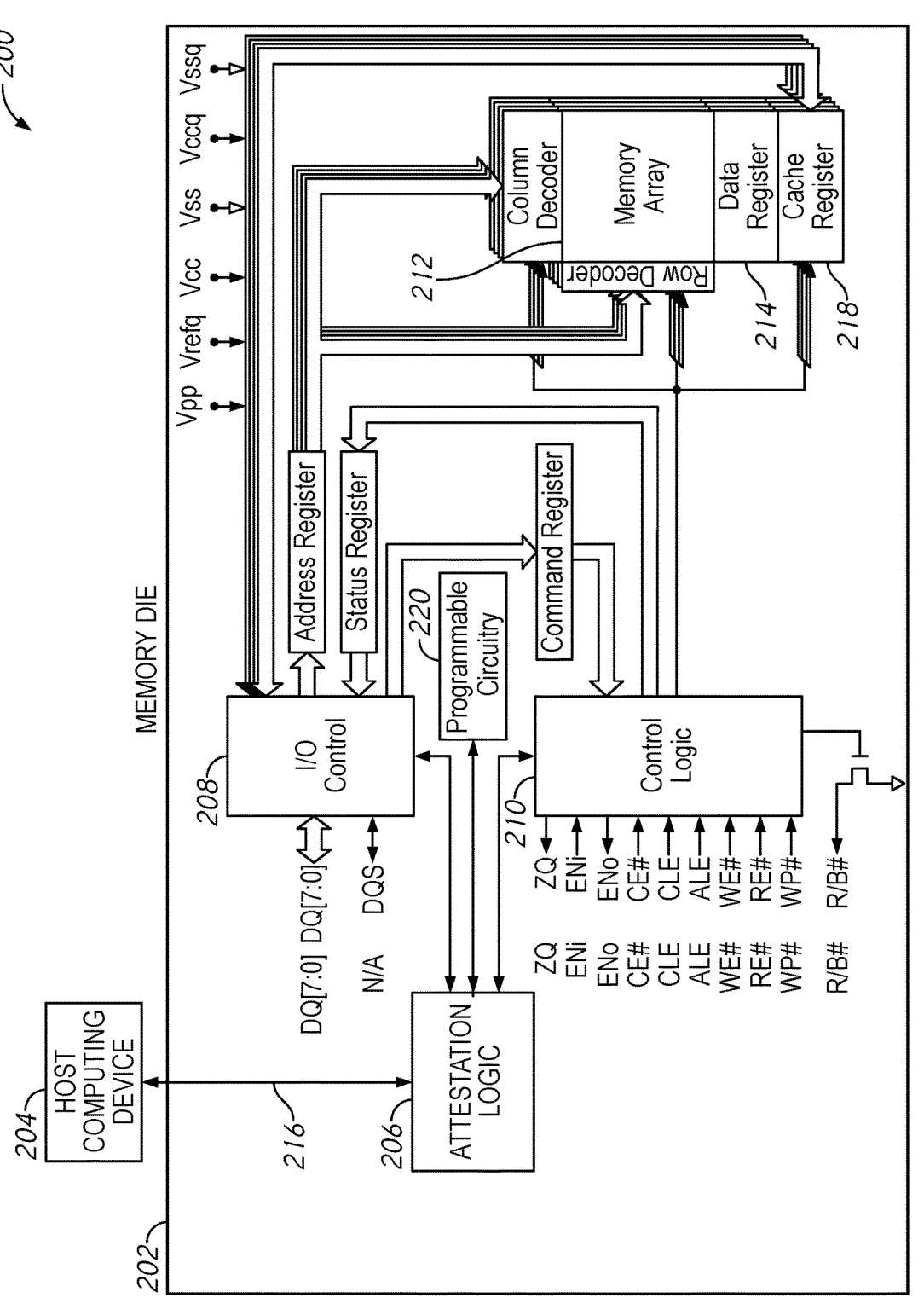
FIG. 2 is a schematic illustration of a memory system arranged in accordance with examples described herein.

FIG. 2 is a schematic illustration of a memory system 200 arranged in accordance with examples described herein. System 200 includes a host computing device 204 coupled to the memory die 202 via host bus 216. Memory die 202 includes memory array 212, data register, 214, cache register 218, and a row decoder & column decoder that interact with the memory array 212 to facilitate memory access requests. The memory die 202 also includes attestation logic 206 that couples to the host computing device 204 via the host bus 216 (and in some examples via a memory controller, not shown). Attestation logic 206 interacts with programmable circuitry 220 to store or retrieve a memory identifier associated with the memory array 212. Attestation logic 206 is also coupled to input/output (I/O) control 208 via an I/O bus and coupled to control logic 210 via a control bus. For example, internal I/O and control buses may be coupled to attestation logic 206 via conductive traces fabricated on the memory die 202. Advantageously, by attesting memory die 202 using a memory identifier stored in programmable circuitry 220 (e.g., in contrast to memory controller 102 alone attesting itself using controller attestation logic 106)— the system 200 provides increased security for data processed by memory die 202.

Control logic 210 interacts with other elements of the memory die 202, including memory array 212 through the data register 214 and cache register 218. The I/O control 208 also interacts with memory array 212, e.g., as certain control pins are enabled at the control logic 210. For example, certain control pins depicted in FIG. 2 (e.g., Eni, CE#, CLE, ALE, WE#, RE#, WP#) may receive control signals that enable operations of the I/O control 208 corresponding to that control pin functionality. In various implementations, the memory die 202 may be a NAND memory device, and the memory array 212 may be a NAND Flash memory array or a DRAM memory array. In addition the numbered elements of memory die 202, as will be appreciated by one of skill in the art, other features of a memory device (e.g., a NAND memory device) may be included in memory die 202, such as the various voltages available to elements of the memory die 202 (e.g., Vpp, Vrefq, Vcc, Vss, Vccq, and/or Vssq). For example, as depicted, an address register may interact with I/O control 208 to store and/or provide memory addresses to access at memory array 212 using a row decoder and a column decoder coupled to the memory array 212. Also as depicted, a status register may interact with I/O control 208 and control logic 210 to store and/or provide a status of certain memory elements in memory die 202. And, a command register may interact with I/O control 208 and control logic 210 to store and/or provide a command from I/O control 208 to control logic 210.

Additionally or alternatively, it can be appreciated that the similarly-named elements of system 100 and system 200 may be configured in an analogous way, such as: host computing device 104 to host computing device 204, host bus 118 to host bus 216, and attestation logic 126 to attestation logic 206. For example, as analogously described with respect to host bus 118, the host bus 216 may be a PCIe bus that can communicate memory access request between the host computing device 204 and, instead of the host bus 118 FIG. 1, the memory die 202 of FIG. 2. For example, in an example implementation where the memory die 202 includes a DRAM memory array as memory array 212, the host bus 216 may be a DRAM bus that couples the memory die 202 to the host computing device 204. Accordingly, similar as described with respect to FIG. 1, the host computing device 204 may attest the memory die 202 using a memory identifier associated with the memory array 212. As another example, the memory die 202 may operate similarly to memory die 122 implemented on one of memory devices 124, which may be one or more types of memory, including but not limited to: DRAM, SRAM, TLC NAND, SLC NAND, SSD, or 3D XPoint. Accordingly, depending on a memory device implementation, the memory array 124 may be a DRAM memory array, an SRAM memory array, a TLC memory array, a NAND memory array, a SLC NAND memory array, a SSD memory array, or a 3D XPoint memory array.

While described host bus 216 was described above in the context of a DRAM bus coupled to host computing device 204, it can be appreciated that host bus 216 may be representative of a connection to host computing device 204 via one or more buses including a host bus physically connected to the host computing device 204. In an example, attestation logic 206 may be coupled via host bus 216 (via a controller in some examples) to host computing device 204 through one or more buses, including a memory bus coupled to a memory controller, which couples to a physical host bus through a memory interface (e.g., as depicted with respect to a memory buses 116, host interface 108, and host bus 118 of FIG. 1). Accordingly, host bus 216 may be representative of a host connection from memory die 202 to the host computing device 204 that is implemented by traces on the memory die 202, which are coupled to a logic layer of a die that memory die 202 is formed upon and coupled further to a physical bus that connect the host computing device 204 to the logic layer of the die that memory die 202 is formed upon. For example, if memory array 212 is implemented using a NAND memory array, the memory die 202 may be implemented as part of a NAND memory device which couples to the host computing device 204 via a memory controller implemented at a logic layer of a CMOS die that NAND memory array is formed upon. For example, the memory controller may be connected to the NAND memory array via traces on a board that are configured to communicate in accordance with the Open NAND Flash Interface (ONFI) specification. The logic layer of the CMOS die may provide a physical connection to the host computing device 204, e.g., through a PCIe bus. Accordingly, the host bus 216 from the memory die 202 to the host computing device 204 may refer to one or more buses that connect to the host computing device 204.

Attestation logic 206 interacts with programmable circuitry 220 to attest the memory die 202, to the host computing device 204, using a memory identifier stored in the programmable circuitry 220, the memory identifier being associated with the memory array 212 by virtue of being the memory array 212 on the memory die 202. Accordingly, the attestation logic 126 can be said to have individually attested the memory array 124.

The memory identifier may be provisioned in the programmable circuitry 220 during a manufacturing process of the memory die 202 (e.g., by a designer or manufacturer of the memory die 202). The programmable circuitry may store the memory identifier based on the provisioned memory identifier, which may be referred to as a provisioned memory key for the memory die 202. The programmable circuitry 220 may be implemented using a one-time programmable (OTP) circuit, e.g., such as or including a one-time programmable (OTP) fuse.

In the example of programmable circuitry 220 being a OTP fuse, a OTP fuse may be part of a fuse array, e.g., of fuse elements, anti-fuse elements, or combination thereof. Each fuse element or anti-fuse element of a fuse array may have an initial state and a blown state. For example, in the initial state, a fuse may be a conductive element; while in the blown state, the fuse may be non-conductive. An anti-fuse may be initially non-conductive and may be conductive once blown. The fuses/anti-fuses may be blown by a process which is irreversible. For example, permanent changes may be made to the structure of the programmable circuitry 220, which forms the fuse/anti-fuse, such as applying a large voltage (e.g., greater than a threshold voltage) across the fuse/anti-fuse, or etching the fuse/anti-fuse with a laser. Accordingly, each fuse/anti-fuse element may represent a binary bit with a permanent state, and the state of the fuses/anti-fuses a fuse array may be used to permanently encode a memory identifier on the memory die 202. Accordingly, during the manufacturing and/or provisioning process the fuse elements may have their state permanently change; for example, the fuses may be 'blown' to be indicative of the memory identifier. The blown fuses are referred to as a OTP fuse of the programmable circuitry 220, which are indicative of the memory identifier.

A memory die 202 may have a relatively large number of fuses, each of which may be blown or not blown based on, for example, repair operations, trimming the device, or specifying settings of the device. Some of these may be based on minor differences in the manufacturing of that memory die 202. For example, a given fuse array may include tens of thousands of individual fuses. Accordingly, if there are, for example, 60,000 fuses then the fuse array may have $2^{\hat{}}60,000$ possible states. Since some of the states of the fuses may be based on characteristics which are unique to a particular memory die 202, the state of the fuse array may generally be considered to be unique to a given memory die 202. Accordingly, it may be highly improbable that the fuse elements of any two memory dies 202 have an exactly matching state. The state of the fuses in the fuse elements may thus be used to generate a unique identification which is representative of the provisioned memory identifier that is referred to as stored in the programmable circuitry 220.

While described above in the example of programmable circuitry 220 as fuse elements of a fuse array, it can be appreciated that programmable circuitry 220 may be implemented using any OTP circuit. Generally, the programmable circuitry 220 may be a separate memory component of memory die 202, e.g., different than memory array 212. For example, the programmable circuitry 220 may not include any memory cells from the memory array 212.

The attestation logic 206 may retrieve the provisioned memory identifier from the programmable circuitry 220 to use the memory identifier to generate a key pair—a public key and a private key, both unique to the memory die 202 based on the provisioned memory identifier. In the example, the programmable circuitry 220 may provide a look-up table and/or listing indicative of which fuses of programmable circuitry 220 are blown, which are indicative of the provisioned memory key.

Upon receiving the memory identifier at the attestation logic 220 from the programmable circuitry 220, the memory identifier may act as a 'seed' for the attestation logic 220 to generate the key pair. For example, the attestation logic 220, like attestation logic 126, may use a DICE to generate the key pair. As another example implementation, the attestation logic 220 may implement a hash (e.g., a secure hash algorithm (SHA)) Accordingly, the attestation logic 220 may perform a sequence of loops based on the memory identifier, each of which involve making a variety of calculations, in order to eventually generate a public key and private key based on the memory identifier.

As described with respect to attestation logic 126 of FIG. 1, the attestation logic 220 may also generate a certificate template that includes the public key and may sign the certificate template using the generated private key. The signed certificate template including the public key may be provided to the host computing device 104 by the attestation logic 126 to the host computing device 204. The host computing device 204 may use the signed certificate template including the public key, to register the memory die 202, e.g., as a trusted component. For example, in various implementations, the host computing device 204 may record the memory die 202 as a trusted component by generating a registration certificate for the memory die 202 based on a private key of the host computing device 204 and the public key included in the signed certificate template. As described with respect to FIG. 5, a host computing device (e.g., host computing device 204) may interact with a certificate registry to record trusted memory dies (e.g., memory die 202). Once an authenticated registration certificate is obtained by attestation logic 206 (e.g., a registration certificate signed by the host computing device 204 using a private key of the host computing device 204), attestation logic 206 may register the memory array 212 as the trusted component by storing the authenticated registration certificate on the memory die 202.

Attestation logic 206 may interact with I/O control 208 and control logic 210 to store the authenticated registration certificate in cache register 218, in a non-volatile memory of the memory die 202, or any register of the memory die 202 where attestation logic 206 may retrieve the authenticated registration certificate upon request by the host computing device 204. In an example, receiving an authenticated registration certificate at attestation logic 206 can include control signals being provided to control logic pins of the control logic 210 via the control bus 620, such as control logic pins: WE#, CLE, and/or ALE. The host computing device 204 may provide control signals in conjunction with the authenticated registration certificate to indicate that the signed registration certificate is being provided to memory die 202 and that memory die 202 may register itself as a trusted component. In an example of obtaining a control signal from the host computing device 204, a control signal may be obtained at the command latch enable (CLE) pin of the control logic 210, which may be indicative to the memory die 202 that a registration certificate has been received at attestation logic 206. Accordingly, the control logic 210 may activate a gate of a transistor that controls a R/B# pin output that indicates a Ready/Busy status of the memory array 212. For example, in obtaining the control signal at the CLE pin, the control logic 210 may provide a gate signal to a transistor such that the drain of the transistor (e.g., if a n-type transistor) sets to low, indicative of a Ready status at the memory array 212. Accordingly, the control logic 210, responsive to obtained one or more control signals indicative of an authenticated registration certificate, may provide internal control signals to control various memory access circuits to perform subsequent memory access operation (e.g., read, write, program) to be received by the host computing device 204, once the memory die 202 has registered as a trusted component of the host computing device 204. For example, the internal control signals may comprise one or more memory access requests to perform memory access operations. The memory access requests may include memory addresses of cells that are to be accessed in performing the memory access operations.

Various memory access circuits may be used during such memory access operations, and may generally include circuits such as row and column decoders, charge pump circuits, signal line drivers, I/O control 208, data register 214, and cache register 218. The memory cells in the memory array 212 may be accessed through the use of various signal lines, for example, global word lines (GWLs), local word lines (LWLs), and bitlines (BLs). The memory array 212 includes a number of memory cells. Each memory cell may store information. For example, each memory cell may store a single bit of information. The memory cells may be organized at the intersection of word lines WL (rows) and bit lines BL (columns). Each memory cell may thus be specified by a row address (which specifies a particular word line) and a column address (which specifies a particular bit lines). The memory cells may be non-volatile memory cells, such as NAND or NOR flash cells, phase change memory cells, or may generally be any type of memory cells. The memory cells may be single level cells configured to store data for one bit of data. The memory cells may also be multi-level cells configured to store data for more than one bit of data.

Generally, commands, address information, and write data may be provided to the memory array 212 as sets of sequential I/O transmitted through the various buses coupling the I/O control 208 and the memory array 212. A DQS signal (e.g., at a DQS pin) may be used to provide timing information for the transfer of data to the memory array 212 or from the memory array 212. An address register coupled to the I/O control 208 may be provided address information by the I/O control 208 to be temporarily stored. The I/O control 208 may also be coupled to a status register storing status bits. Status bits stored by the status register may be provided by the I/O control circuit I/O control 208 responsive to a read status command provided to the memory array 212, for example. The status bits may have respective values to indicate a status condition of various aspects of the memory array 212 and its operation.

Additionally or alternatively, upon obtaining the authenticated registration certificate at the attestation logic 206, the attestation logic 206 may store the authenticated registration certificate on the memory die 202. In the example, the attestation logic 206 may provide the registration certificate to the I/O control 208, e.g., to the DQ pins of the I/O control 208 via the I/O bus 616. In the example, the I/O control 208 may obtain the image code from the DQ pins when one or more control signals at the control logic 210 are asserted. For example, a combination of control signals may be provided to the control logic 210 such that the I/O control 208 obtains the registration certificate to provide the registration certificate to the cache register 218. For example, the control logic 210 may obtain an additional control signal indicative from the attestation logic 206 that the registration certificate is to be written to the cache register 218 of the memory die 202, and thus the I/O control 208 provides the registration certificate to the cache register 218. In the example, the additional control signal may be obtained at the write enable (WE#) pin of the control logic 210, subsequent to when the one or more controls signals at the control logic 210 are asserted to obtain the registration certificate from the DQ pins. In activating the WE# pin, certain voltages (e.g., Vrefq) may be provided to the cache register 218 to enable writing of registration certificate to the cache register 218 by the I/O control 208.

Figure 3:
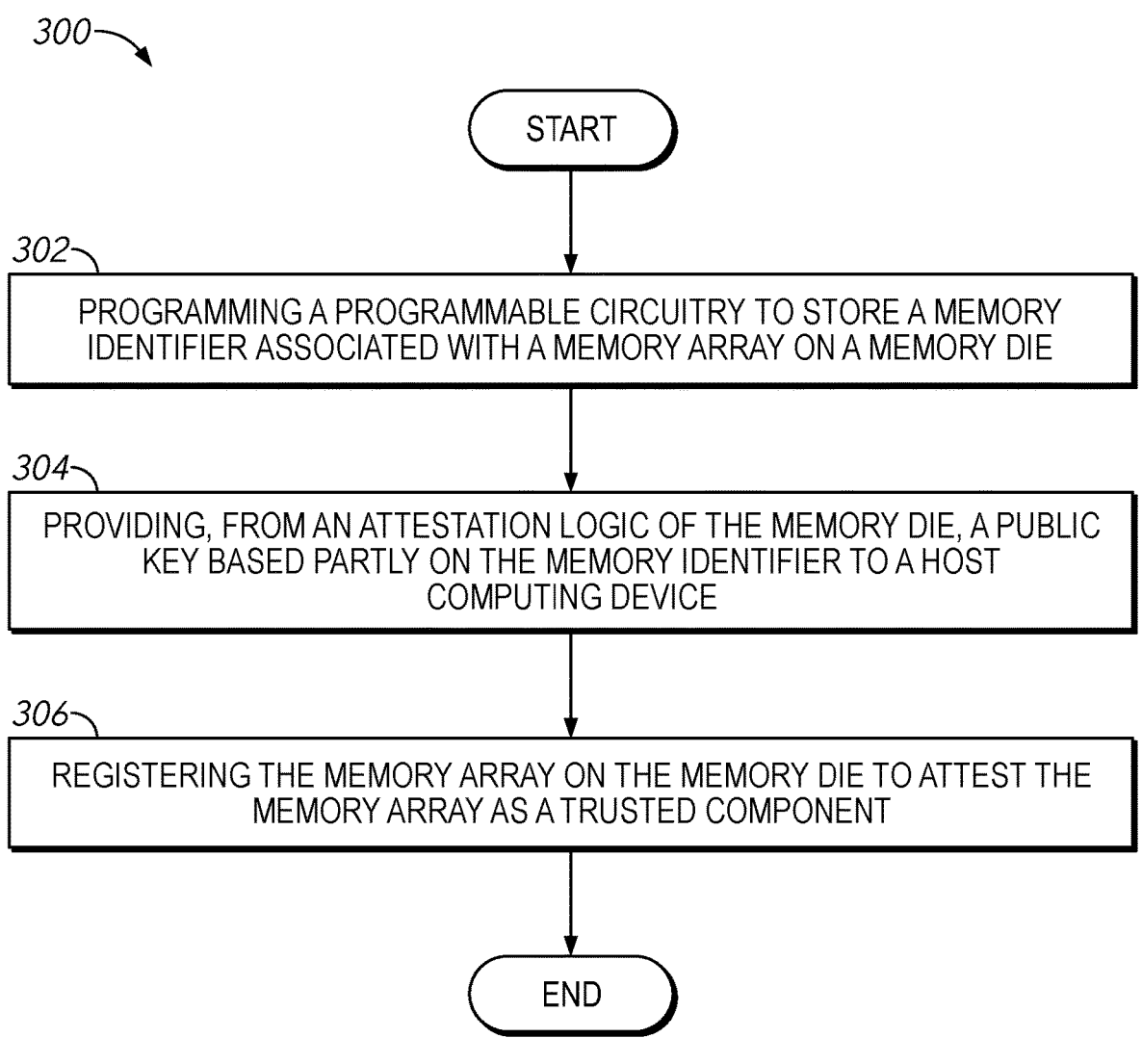
FIG. 3 is a schematic illustration of a method in accordance with examples described herein.

FIG. 3 is a schematic illustration of a method 300 in accordance with examples described herein. Example method 300 may be performed on and/or by a memory die, for example, a memory die 202 that interacts with host computing device 208 to attest the memory die 202 as a trusted component. For example, the operations described in blocks 202-206 may be implemented on and/or by the memory die 202, e.g., as part of a manufacturing or provisioning process for the memory die 202. For example, block 302 may occur during a manufacturing process of a memory die 202 or during a provisioning process of the memory die 202 by the manufacturer such that block 302 is performed prior to an operation or initialization of the memory die 202. Blocks 304 and 306 may be performed during an initial operation or initialization process of the memory die 202, e.g., at boot up or power on of the memory die 202 or when the memory die 202 also has a connection to a host computing device 204.

Example method 300 may begin with block 302 that start execution of the method and includes programming a programmable circuitry to store a memory identifier associated with the memory array on a memory die. In an example implementation of the memory die 202, a memory identifier is programmed into programmable circuitry 220, e.g., by blowing certain fuses, antifuses, or combinations thereof of a fuse array in the programmable circuitry 220. In example where a memory die 202 includes a single memory array 212, memory identifier is associated with the memory array 212 by virtue of the memory array 212 being the single memory array 212 on the memory die 202. Block 302 may occur during a manufacturing or provisioning process by a manufacturer or designer of the memory die 202. In the example, the memory die 202 may receive signals (e.g., at control pins of control logic 210) that indicate to the attestation logic 206 that a certain memory identifier is to be programmed into the programmable circuitry 220. The attestation logic 206 may be utilized to inject the memory identifier into the programmable circuitry. In the example, a designer or manufacturer may apply voltages via the I/O control 208 that are used by the attestation logic 206 to blow certain fuses of a fuse array in the programmable circuitry 220. While described in terms of a fuse array at programmable circuitry 220, it can be appreciated that programmable circuitry 220 may be programmed in a manufacturing or provisioning process depending on the type of programmable circuitry used, e.g., OTP memory or the like. Advantageously, in using method 300, each OTP fuse may be blown at the factory when the memory die 202 is ready for deployment or shipping. Accordingly, each memory die 202 has a unique memory identifier, which may referred to as a secure key for the memory die 202, which may be independently verifiable by the manufacture or designer (e.g., provisioner) of the secure key.

Block 302 may be followed by block 304, such that the method further includes providing, from an attestation logic of the memory die, a public key based partly on the memory identifier to a host computing device. To provide a public key based partly on the memory identifier, the attestation logic 206 may retrieve the provisioned memory identifier from the programmable circuitry 220. In the example, the attestation logic 206 may use one or more logic gates (e.g., OR, AND, XOR, NAND, an inverter, etc.) of the attestation logic 206 to identify the memory identifier in the programmable circuitry 220. Continuing in the example and where the memory identifier may be stored in a OTP fuse array, the attestation logic 206 may identify certain blown and non-blown fuses of an OTP fuse array to correspond to a binary indication of the memory identifier, which the logic gates may process to output a listing indicative of the blown fuses. Accordingly, the attestation logic 206 may identify a memory identifier stored in a fuse array of the programmable circuitry 220.

Continuing with respect to block 304, once the memory identifier is identified by attestation logic 206, the attestation logic 206 may further generate an encryption key pair comprising a public key and a private key based on the memory identifier. In the example, the memory identifier may be input to a DICE that is implemented at attestation logic 206 and may output the public key and private key based on the memory identifier. With the memory identifier being unique to the memory die 202, the public key and private key generated by attestation logic 206 are also unique to the memory die 202 and may be said to be associated with the memory array 212. Once a public key is generated providing, from an attestation logic of the memory die, the generated public key may be provided to a host computing device (e.g., host computing device 204). As block 304 may be performed at boot up or power on of the memory die 202 (e.g., when the memory die 202 has a connection to a host computing device 204), the attestation logic 206 may provide the public key to the host computing device 204 to attest the memory die 202. In the example, the public key may be provided in a certificate template that attestation logic 206 signs with the generated private key, to authenticate the certificate template including the public key as being specific to the memory die 202.

Block 304 may be followed by block 306, such that the method further includes registering the memory array on the memory die to attest the memory array as a trusted component. To attest a memory array as a trusted component, attestation logic 206 may obtain, from the host computing device 204, a registration certificate authenticated by the host computing device 204. Once an authenticated registration certificate is obtained by attestation logic 206, attestation logic 206 may register the memory array 212 as the trusted component by storing the authenticated registration certificate on the memory die 202. In the example, the attestation logic 206 may interact with I/O control 208 and control logic 210 to store the authenticate registration certificate in cache register 218, in a non-volatile memory of the memory die 202, or any register of the memory die 202 where attestation logic 206 may retrieve the authenticated registration certificate upon request by the host computing device 204.

Continuing with respect to block 306, from the perspective of the host computing device 204, when the signed certificate including the public key of the memory die 202 is obtained by the host computing device 204, the host computing device generates a registration certificate using the signed certificate template including the public key and a private key of the host computing device 204. For example, the generated registration certificate may be an X.509 certificate. Optionally, the host computing device 204 may provide, to a certificate registry, the registration certificate to record the registration certificate. The host computing device 204 provides the registration certificate to the attestation logic 206 once signed by the host computing device with its private key. The method 300 ends after execution of the block 306.

The blocks included in the described example method 300 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 4:
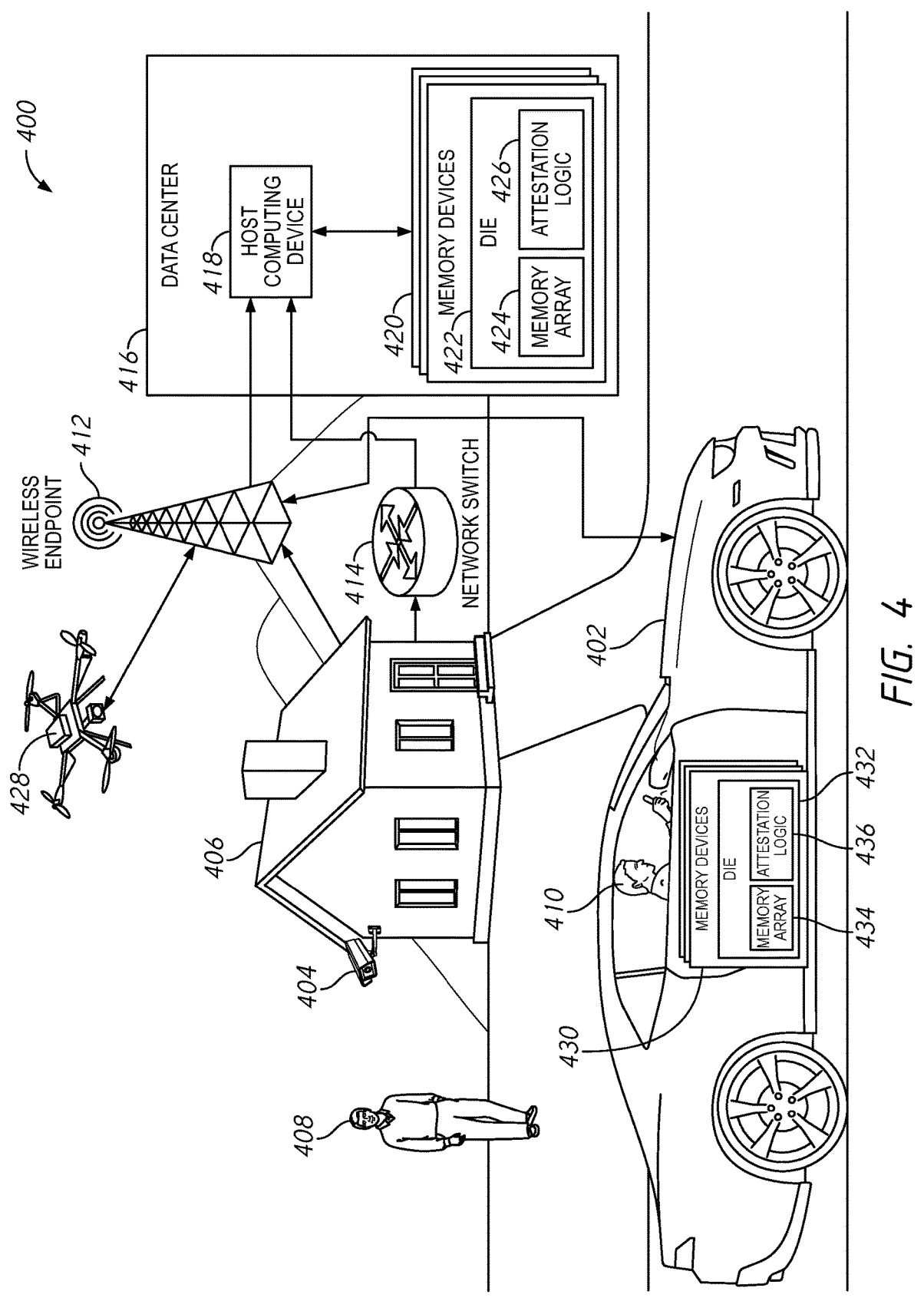
FIG. 4 is a schematic illustration of a system arranged in accordance with examples described herein.

FIG. 4 illustrates an example of a system 400 in accordance with examples described herein. The system 400 includes a person 408 who may have a wireless device (e.g., a smartphone), a vehicle 402 with a person 410, and a drone 428. The vehicle 402 and any wireless devices in system 400, such as a smartphone in person 408's pocket, may be communicatively coupled via a wireless network to wireless endpoint 412. For example, the wireless network and associated wireless connections to wireless devices, like drone 428 and vehicle 402 may be a wireless network based on a 5G protocol or a WiFi protocol. Drone 428 may also be communicatively coupled via a wireless network to wireless endpoint 412. Vehicle 402 may include memory devices 430 which include respective memory dies and respective memory arrays. As depicted, memory die 432 may include a memory array 434 an attestation logic 436.

System 400 also includes an IoT device 404 adhered to a house 406 and may be communicatively coupled to the house 406, e.g., via a wired connection (not depicted). The house 406, which may include a network endpoint, is coupled to a network switch 414 that couples the house 406 to data center 416. For example, the house 406 may be coupled to the network switch 414 via a wired (e.g., fiber optic, Ethernet) and/or wireless connection (e.g., Wi-Fi, Bluetooth). The IoT device 404 may also be communicatively coupled via a wireless connection to a wireless endpoint 412. For example, the wireless connection for the IoT device 404 may be a narrowband wireless communication connection in accordance with a Narrow Band IoT (NB-IoT) 5G standard. The wireless endpoint 412 is coupled via a wired connection (e.g., a fiber optic cable) to the data center 416. The data center 416 includes a host computing device 418 coupled to memory devices 420 which include respective memory dies and respective memory arrays. As depicted, memory die 422 may include a memory array 424 and attestation logic 426.

System 400 provides for wireless and IoT communications with host computing device 418. In the example, the vehicle 402 with memory devices 430, a drone 428 with memory devices (not depicted), IoT device 404 with memory devices (not depicted), or a smartphone (not depicted) used by person 408 may communicate with host computing device 418 via wireless endpoint 412, which is communicatively coupled with data center 416, using wireless or IoT communications.

Additionally or alternatively, it can be appreciated that similarly-named elements of system 200 and system 400 may be configured in an analogous way, such as: host computing device 204 to host computing device 418, and attestation logic 206 to attestation logic 436 or attestation logic 426. Accordingly, similar as described with respect to FIG. 2, the host computing device 418 may attest the memory die 422, at attestation logic 426, using a memory identifier associated with the memory array 424.

Advantageously, system 400 facilitates attestation of memories implemented on IoT devices, like vehicle 402 with memory devices 430, a drone 428 with memory devices (not depicted), IoT device 404 with memory devices (not depicted), or a smartphone (not depicted) used by person 408 to access IoT or wireless networks. Memory dies on memory devices using the systems and methods described may be individually-authenticated memory dies which can provide data using a secured RoT relationship. For example, because individual memory dies of vehicle 402, drone 428, IoT device 404, or a smartphone attest to a host computing device 418, secure connections can be facilitated with an enterprise network (e.g., a VPN connection) hosted by host computing device 418. For example, host computing device 418 may be hosted by a vendor, manufacturer, or designer of memory die 422, memory die 432, or any other memory dies of wireless or IoT devices in system 400. Thereby, host computing device 418 can provide registration certificates to attested memory dies of system 400. Because the memory dies of system 400 have a RoT relationship with host computing device 418, attested memory dies may avoid the disadvantages of conventional systems that do not support individual memory attestation. For example, if a malicious actor were replace a memory device on vehicle 402, drone 428, IoT device 404, or a smartphone of person 408 in an attempt to gain access to the enterprise network (e.g., if the replaced memory device were to include malicious code), a newly-booted memory device or initialized memory device would fail attestation with the host computing device 418. Accordingly, individual attestation logic at memory dies in system 400 may facilitate a secure and RoT connection with an enterprise network, for each memory die, such that data may be securely accessed on vehicle 402, drone 428, IoT device 404, or a smartphone of person 408.

System 400 facilitates remote attestation of memory dies by a host computing device 418. For example, by attesting each memory die using a respective memory identifier, a non-attested or compromised memory die may be remediated, e.g., by debugging the memory die remotely or by monitoring the memory die for malicious actions by a malicious actor (e.g., a hacker accessing the memory die 432). For example, as described with respect to method 600 of FIG. 6, responsive to powering on a memory device (e.g., a memory device 430), a host computing device 418 may verify whether a registration certificate stored on memory die is authenticated. If the host computing device 418 determines that authentication has failed, the host computing device 418 may remediate access to the memory array of the memory die remotely. Accordingly, if a malicious actor were to replace the memory die 432, the memory device 430 having had that replaced memory die 432 would fail authentication by a host computing device 418. In the example, the host computing device 418 may be hosted by a manufacturer or vendor of memory die 432, and, accordingly, the manufacturer or vendor of the memory die 432 may remediate access to certain memory devices 430 which are compromised, e.g., because attestation of a memory die failed.

Figure 5:
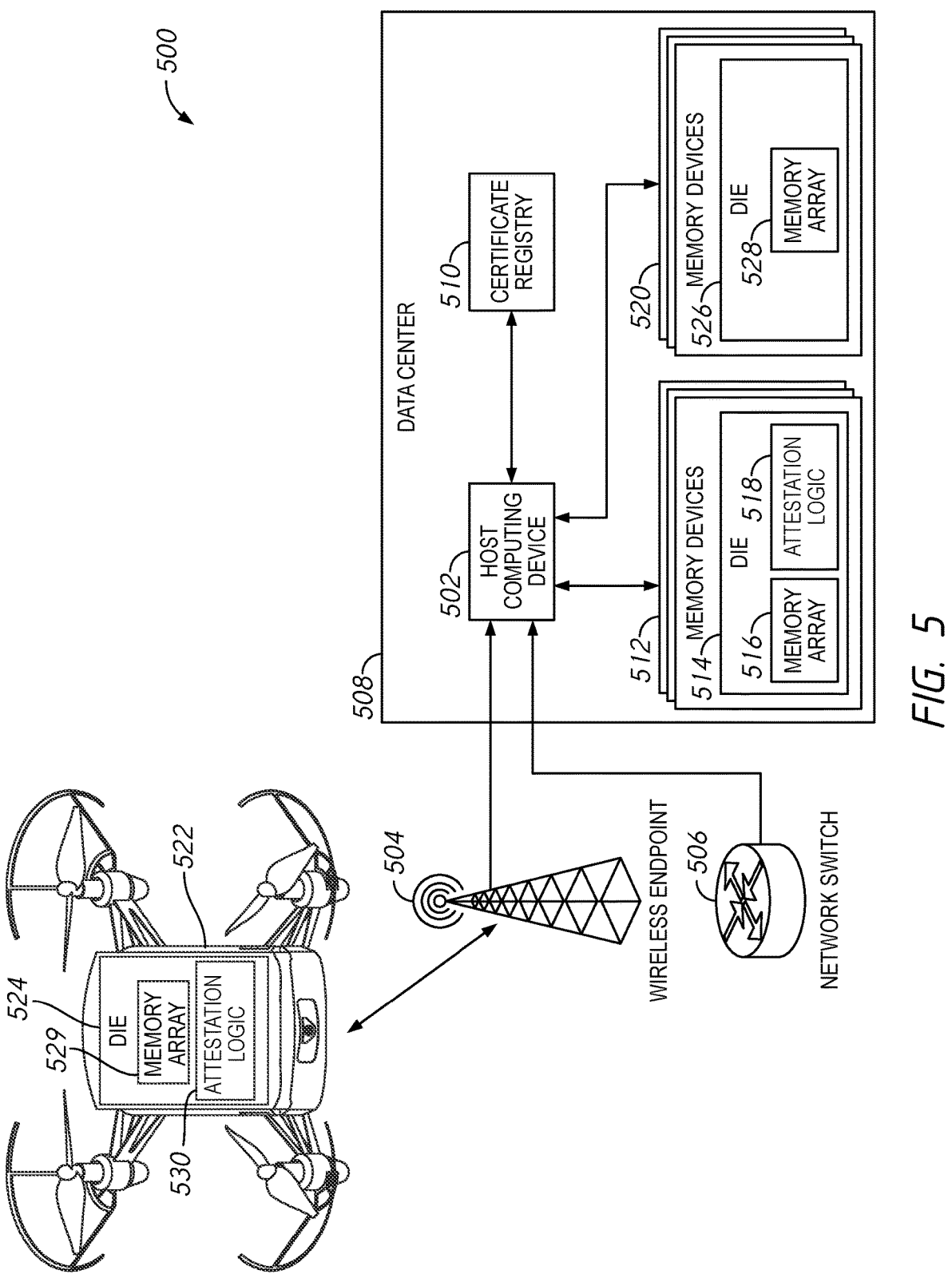
FIG. 5 is a schematic illustration of a system arranged in accordance with examples described herein.

FIG. 5 is a schematic illustration of a system 500 arranged in accordance with examples described herein. The system 500 includes a drone 522 which may be communicatively coupled via a wireless network to wireless endpoint 504. For example, wireless network that the drone 528 is communicatively coupled to wireless endpoint 504 may be a wireless network based on a 5G protocol or a WiFi protocol. A 5G protocol may include the use of narrowband wireless communication connection in accordance with a NB-IoT 5G standard. Accordingly, the drone 522 may communicate with wireless endpoint 504 via narrowband wireless communications in accordance with a NB-IoT 5G standard. Drone 522 may include a memory die 524 that comprises a memory array 529 and an attestation logic 530.

System 500 also includes a network switch 506 that communicatively couples network endpoints (not depicted) to data center 508. For example, the network switch 506 may communicate wired (e.g., fiber optic, Ethernet) and/or wireless connection (e.g., Wi-Fi, Bluetooth) to the data center 508. Data center 508 includes a host computing device 502 coupled to a certificate registry 510, memory devices 512, and memory devices 520. In an example implementation, the host computing device 502 may be implemented as a Microsoft® Azure® server which provisions and hosts IoT devices, and may be referred to as an IoT Hub Device Provisioning Service. Memory devices 512 includes at least one memory device having a memory die 514 with a memory array 516 and attestation logic 518. Memory devices 520 includes at least one memory device having a memory die 526 with a memory array 528.

Additionally or alternatively, it can be appreciated that similarly-named elements of system 200 and system 500 may be configured in an analogous way, such as: host computing device 204 to host computing device 502, and attestation logic 206 to attestation logic 518 or attestation logic 530. Accordingly, similar as described with respect to FIG. 2, the host computing device 502 may attest the memory die 514, at attestation logic 518, using a memory identifier associated with the memory array 516. And, host computing device 502, being communicatively coupled to the drone 522 via wireless endpoint 504, may attest the memory die 524 of drone 522, at attestation logic 530, using a memory identifier associated with the memory array 528.

At boot or initiation of the drone 522 or memory devices 512, the respective memory dies 524 and 514 may attest their respective memory arrays 529 and 516 to the host computing device 502. For example, as described with respect to FIG. 2 and attestation logic 220, the attestation logic 530 may retrieve a provisioned memory identifier from programmable circuitry to use the memory identifier to generate a key pair—a public key and a private key, both unique to the memory die 524 based on the provisioned memory identifier. In some examples, prior to an operation or initialization of the memory die 524, attestation logic 530 may be utilized to inject the memory identifier into the programmable circuitry. In some examples, the host computing device 502 as part of a provisioning service may inject the memory identifier into the programmable circuitry of the attestation logic 530 when the drone 522 establishes a connection with host computing device 502, e.g., a wireless connection via wireless endpoint 504.

To establish a secured RoT relationship with host computing device 502, drone 522 may attest its memory die 524 and associated memory array 529 to the host computing device 502 using attestation logic 530. Accordingly, memory die 524 on drone 222 may be individually-authenticated by the host computing device 502 at the data center 508. For attestation of the memory die 524, attestation logic 530 generates a certificate template including the generated public key based on the provisioned memory identifier to the host computing device 502. The attestation logic 530 signs the certificate template using the generated private key and provides the signed certificate template to the host computing device 204 via wireless endpoint 504, e.g., via a NB-IoT communication protocol.

When host computing device 502 obtains the signed certificate including the public key of the memory die 524, the host computing device 502 generates a registration certificate based on the signed certificate template including the public key, using a private key of the host computing device 204. For example, the generated registration certificate may be an X.509 certificate. The host computing device 502 may provide the signed registration certificate to the certificate registry 510. The certificate registry 510 may record the signed registration certificate. Once recorded at the certificate registry 510, the host computing device 502 provides the registration certificate to the attestation logic 530 for storage on attestation logic 530. For example, the host computing device 502 may communicate the registration certificate (e.g., an X.509 certificate) via wireless endpoint 504 to drone 522. Once an authenticated registration certificate is obtained by attestation logic 530, attestation logic 206 may register the memory array 529 as a trusted component by storing the authenticated registration certificate on the memory die 524 (e.g., at a cache register of the memory die); thereby establishing a RoT relationship with host computing device 502. Accordingly, the host computing device 502 can facilitate a secure connection with drone 522 For example, using the secured connection with drone 522, drone 522 may access an enterprise network via the host computing device 502, such as an enterprise network of a business that owns the drone 522 or a manufacturer of the die 524. The secured connection may be implemented as Virtual Private Network (VPN) through host computing device 502.

While the example of FIG. 5 of a drone 522 establishing a secure RoT relationship with a host computing device 502 was described in the context of the depicted drone 522, it can be appreciated that any IoT device or device communicating in accordance with a NB-IoT protocol may establish a secure RoT relationship with host computing device 502 in accordance with the example described with respect to the drone 522, e.g., using a certificate registry 510.

Die 514, implemented in one of the memory devices 512, may also establish a secured RoT relationship with host computing device 502. The memory die 514 may attest itself and associated memory array 516 to the host computing device 502 using attestation logic 518. And similar to drone 522, the host computing device 502 may provide a signed registration certificate, based on a certificate template including the public key generated by attestation logic 518, to the certificate registry 510. The certificate registry 510 may record the signed registration certificate. Once recorded at the certificate registry 510, the host computing device 502 provides the registration certificate to the attestation logic 518 for storage on memory die 514. Once an authenticated registration certificate is obtained by attestation logic 518, attestation logic 518 may register the memory array 516 as a trusted component by storing the authenticated registration certificate on the memory die 514 (e.g., at a cache register of the memory die); thereby establishing a RoT relationship with host computing device 502. Accordingly, the host computing device 502 can facilitate a secure connection with one of the memory devices 512 having the die 514. Accordingly, memory die 514 may be individually-authenticated by the host computing device 502 at the data center 508.

Memory die 526 maintains a connection to the host computing device 502, but does not have an attestation logic, like attestation logic 518 of die 514. Accordingly, the die 526 of the memory devices 520 may be susceptible to a malicious actor physically replacing memory array 528 or accessing memory array 528 via malicious code in the data center 508. For example, malicious code in the data center 508 may be installed on a computing device in the data center 508 (e.g., host computing device 502) during a QoS attack or a cybersecurity attack. Accordingly, the memory array 516 may be susceptible to breach or unauthorized access by a malicious user (e.g., the user who created the malicious code). In contrast, if the memory array 516 were physically replaced, when host computing device 502 were to access the die 514, the host computing device may determine that the computing device coupled to the memory devices 512 has failed verification of the registration certificate, e.g., as described with respect to method 600 of FIG. 6. Accordingly, the host computing device 502 may indicate to the attestation logic 518 that access to the memory array 516 should be remediated. In an example, an operator of the host computing device 502 (e.g., a manufacturer of die 514 or service provider of host computing device 502) may access the memory array 516 remotely to debug the failed verification, e.g., to determine if malicious code has been written to the memory cells of the memory array 516. For example, using the secure RoT connection, the manufacturer of the memory die 514 may verify remotely that the attested memory array 516 may be debugged for errors or for malicious access attempts. In contrast, in conventional systems without a provisioned key or attestation logic 518, a manufacturer would have to conduct a site visit to the data center 508, to debug the particular memory device having the die 514 or all of the memory devices 512 would be removed and sent back to the manufacturer for debugging. Accordingly, the apparatuses and methods described herein facilitate remote debugging modes.

In some examples, the host computing device 502 can detect that the memory array 516 may be compromised or a non-genuine memory array, such that the operator of the host computing device 502 could observe the behavior of that memory array 516 and/or prevent access to that memory. For example, to observe behavior of a compromised memory array 516, the host computing device 502 may create a virtual "honey bucket," knowingly classifying the memory array 516 as compromised. In the example, when a malicious actor interferes with the memory array 516, an operator of the host computing device 502 can observe or detect patterns of the malicious actor at the designated "honey bucket" memory array 516. In contrast, in conventional systems, when a malicious actor interferes with a memory array in a manner that causes memory controller attestation failure (e.g., failing attestation at a memory controller attestation logic 106), all the memory devices 520 may be shut down by the operator of the host computing device 502 until the compromised memory array 528 can be physically removed for debugging.

Continuing in the example where memory array 516 may be compromised, the non-compromised memory devices of the memory devices 512 may continue to operate as long as the other respective memory dies of the memory devices 512 may attest their trustworthiness to the host computing device 502, e.g., using their respective attestation logic. Accordingly, non-compromised memory devices 512 may be referred to as "tamper-free" or genuine memory dies because they can attest to their status as being provided by the manufacturer directly using a factory-provisioned memory identifier (e.g., provisioned key). Accordingly, the system 500 may facilitate a more efficient use of memory devices 512 in processing data. For example, in dataset applications, the memory devices 512 may be configured to store data including datasets, such as image or content datasets. Using system 500 may allow larger datasets to be used on the memory devices 512, thereby increasing the size of datasets and/or data to be processed/stored on the memory devices 512. Accordingly, a data center 508 including memory devices 512 including dies, like die 514, that have attestation logic, like attestation logic 58, may increase the speed of processing of datasets.

FIG. 6 is a schematic illustration of a method 600 in accordance with examples described herein. Example method 600 may be performed using, for example, a host computing device and attestation logic that interacts with elements of memory die (e.g., cache register or memory array). In an example implementation, some blocks may be executed by a host processor at a host computing device 502 (e.g., blocks 604 and 606), while other instructions may be performed by attestation logic 518 on the memory die 514 (e.g., blocks 602 and 608). The operations described in blocks 602 may be implemented on the memory die 514, e.g., as part of a manufacturing or provisioning process for the memory die 514. For example, block 602 may occur during a manufacturing or provisioning process of a memory die 514 or during a provisioning process of the memory die 514 by the manufacturer such that block 602 is performed prior to an operation or initialization of the memory die 514.

Blocks 604-608 may be performed during an initial operation or initialization process of the memory die 514 when connecting to host computing device 502, e.g., at boot up or power on of the memory die 514 or when the memory die 514 has a connection to a host computing device 502. The operations described in blocks 604 and 606 may be stored as computer-executable instructions in one or more computer-readable medium accessible by a host processor of the host computing device 502. For example, the executable instructions may be stored on one of the memory devices 512. Additionally or alternatively, the executable instructions may be stored on a memory coupled to the host computing device 502 and retrieved by a host processor to execute the executable instructions for performing blocks 604 and 606 of method 600. The blocks included in the described example method 600 are for illustration purposes. In some embodiments, these blocks may be performed in a different order. In some other embodiments, various blocks may be eliminated. For example, in some implementations, blocks 606 and 606 may be optional blocks when executing method 600. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Example method 600 may begin with block 602 that starts execution of the method and includes obtaining, at attestation logic of a memory die, a registration certificate authenticated by a host computing device, the registration certificate is associated with a generated public key of the memory die. Some aspects of block 602 may be executed in a similar way as described with respect to block 306 of method 300 (e.g., in the context of the perspective of host computing device 204 of FIG. 2). In an example implementation of block 602 within the context of FIG. 5, the host computing device 502 may be configured to execute, on a host processor of host computing device 502, a user application which is configured to generate a registration certificate using the signed certificate template including the public key and a private key of the host computing device 204. For example, the public key may be a public key that was generated by attestation logic 518 and provided, by attestation logic 518, to the host computing device 502 as part of a signed certificate template. Accordingly, the host computing device 502 may provide the registration certificate to the attestation logic 518 once signed by the host computing device 502 with its private key, thereby authenticating the provider (e.g., the memory die 514) of the signed certificate template as a trusted component. Continuing with respect to block 602, the attestation logic 518 of the memory die 514 may obtain the registration certificate authenticated by the host computing device 502. Once an authenticated registration certificate is obtained by attestation logic 518, attestation logic 518 may register the memory array 516 as the trusted component by storing the authenticated registration certificate on the memory die 514. In the example, the attestation logic 518 may interact with an I/O control (e.g., I/O control 208) and a control logic (e.g., control logic 210) to store the authenticate registration certificate in a cache register (e.g., cache register 218), in a non-volatile memory of the memory die 514, or any register of the memory die 515 where attestation logic 518 may retrieve the authenticated registration certificate upon request by the host computing device 502.

Block 602 may be followed by block 604, such that the method further includes, responsive to powering on the memory die, using a computing device coupled to the memory die, verifying whether the registration is authenticated. Prior to an initial operation or initialization process of the memory die 514 when connecting to host computing device 502, as described with respect to FIG. 5, the host computing device 502 may have provided a signed registration certificate to a certificate registry 510, to attest the memory die 514. Accordingly, the certificate registry 510 has a record of the signed registration certificate for memory die 514. And, prior to operation or initialization of memory die 514, memory die 514 had stored registration certificate (e.g., an X.509 certificate) on memory die 514 (e.g., at a cache register), to register the memory die 514. Accordingly, at block 604, during an initial operation or initialization process, such as at boot up or power on of the memory die 514 or when the memory die 514 has a connection to a host computing device 502, the host computing device 502, which is coupled to the memory die 514, may query the memory die 514 for a signed registration certificate. The attestation logic 518 of the memory die 514 may retrieve the signed registration certificate from a storage location (e.g., a cache register), and provide the signed registration certificate to the host computing device 502. Host computing device 502 may compare the obtained signed registration certificate (which may not be authentic if the memory die 514 had been replaced) and may compare the obtained signed registration certificate with the recorded signed registration certificate at the certificate registry 510. For example, the host computing device 502 may implement a compare operation using logic gates (e.g., an AND gate) to compare the obtained and recorded registration certificates, to verify whether the obtained registration certificate is the same authenticated registration certificate that was stored in the certificate registry 510 by the host computing device 502. As another example, a user application, executed by a host processor on the host computing device 502, may compare the obtained and recorded registration certificates, to verify whether the obtained registration certificate is the same authenticated registration certificate that was stored in the certificate registry 510 by the host computing device 502.

Block 604 may be followed by block 606, such that the method further includes determining that the computing device coupled to the memory die has failed to verify the registration certificate. As described above, block 606 may be an optional step in some implementations of method 600. In the event the host computing device 502 did not register the memory die 514 as a trusted component (e.g., the public key included in the certificate template fails attestation at the host computing device 204), the host computing device 502 may provide a remediation signal to the attestation logic 518.

Block 606 may be followed by block 608, such that the method further includes remediating, by the attestation logic of the memory die, access to a memory array of the memory die. As described above, block 608 may be an optional step in some implementations of method 600. Upon obtaining the remediation signal regarding the failed verification of the registration certificate at attestation logic 518, attestation logic 518 may interact with I/O control or control logic of the memory die 514 to debug the failed verification of the registration certificate. For example, in the context of elements of the memory die 202, attestation logic 206 of the memory die 202, may provide a control signal to control logic 210 of the memory die 202 to provide access to host computing device 204 to access remotely the memory array 212 for debugging. Additionally or alternatively, control logic 210 may control the memory array 212 to prevent unauthorized access to the memory array 212, given that the memory array 212 is compromised as indicated the failed verification of the registration certificate. For example, the control logic may interact with attestation logic 206 and I/O control 208 to control power to the memory array 212, e.g., to only allow access to the memory array 212 for remotely debugging by a manufacturer of the die 202 or a service provider of the host computing device 204. The method 600 ends after execution of the block 608.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are examples of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of")

indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system comprising:
a memory die associated with a memory identifier, the memory die comprising:
  programmable circuitry configured to store the memory identifier; and
  attestation logic configured to generate an encryption key pair using the memory identifier; and
a host computing device comprising a controller attestation logic, the controller attestation logic configured to attest the memory die using the memory identifier.

2. The system of claim 1, wherein the encryption key pair comprises a public key and a private key, and wherein the attestation logic is further configured to provide the public key to the host computing device.

3. The system of claim 2, wherein the host computing device is configured to generate a registration certificate for the memory die based on a private key of the host computing device and the public key of the encryption pair.

4. The system of claim 3, further comprising:
a certificate registry configured to record the registration certificate, wherein the host computing device is further configured to provide the registration certificate to the certificate registry.

5. The system of claim 1, wherein the programmable circuitry corresponds to a one-time programmable (OTP) circuit.

6. The system of claim 5, wherein the one-time programmable (OTP) circuit is a one-time programmable fuse.

7. The system of claim 1, further comprising:
a plurality of memory dies including the memory die associated with the memory identifier, each memory die of the plurality of memory dies comprising respective attestation logic configured to generate a respective encryption key pair.

8. The system of claim 7, further comprising:
a memory controller coupled to the plurality of memory dies and configured to control the plurality of memory dies; and
a memory interface coupled to the memory controller and configured to communicate with the plurality of memory dies, wherein the host computing device is further configured to attest the memory controller using a controller identifier.

9. The system of claim 7, wherein the host computing device is configured to determine that the memory die is non-attested, wherein the host computing device is configured to prevent access to the memory die when it is determined to be non-attested, and wherein the host computing device is configured to access remaining ones of the plurality of memory dies when the memory die is determined to be non-attested.

10. A method comprising:
programming circuitry of a memory die to store a memory identifier associated with a memory array on the memory die;
generating, using attestation logic included in the memory die, an encryption key pair using the memory identifier, the encryption key pair including a public key and a private key;
transmitting to a host computing device, from the attestation logic of the memory die, the public key; and
writing to a register of the memory array on the memory die to attest the memory array as a trusted component.

11. The method of claim 10, wherein the encryption key pair is generated using a Device Identifier Composition Engine (DICE).

12. The method of claim 11, further comprising:
generating, using attestation logic of the memory die, a certificate template including the public key;
signing, using attestation logic of the memory die, the certificate template using the private key; and
providing, to the host computing device, the certificate template including the public key.

13. The method of claim 12, wherein registering the memory array on the memory die further comprises:
generating, at the host computing device, a registration certificate using the certificate template including the public key and a private key of the host computing device; and
providing, to a certificate registry, the registration certificate to record the same.

14. A memory die, comprising:
programmable circuitry configured to store a memory identifier;
a memory array associated with the memory identifier; and
attestation logic configured to generate an encryption key pair using the memory identifier, the encryption key pair comprising a public key and a private key, and further configured to attest the memory array using the memory identifier to a controller attestation logic of a host computing device coupled to the memory die.

15. The memory die of claim 14, wherein the programmable circuitry comprises:
a fuse array including a plurality of one-time programmable (OTP) fuses programmed with the memory identifier.

16. The memory die of claim 15, wherein the attestation logic is further configured to:
identify the memory identifier stored in the fuse array.

17. The memory die of claim 16, wherein the attestation logic is further configured to:
provide, to a host computing device, a certificate template including the public key;
obtain, from the host computing device, a registration certificate authenticated by the host computing device; and
store the registration certificate.

18. The memory die of claim 14, wherein the memory identifier corresponds to a provisioned memory die key.

19. A method comprising:
generating, at attestation logic of a memory die, an encryption key pair using a provisioned memory identifier specific to the memory die, the encryption key pair comprising a public key and a private key;
transmitting to a host computing device, from the attestation logic of the memory die, the public key;
obtaining, at the attestation logic of the memory die, a registration certificate authenticated by a host computing device, wherein the registration certificate is associated with the generated public key of the memory die; and
responsive to powering on the memory die, using a computing device coupled to the memory die, verifying whether the registration certificate is authenticated.

20. The method of claim 19, further comprising:
determining that the computing device coupled to the memory die has failed to verify the registration certificate; and
remediating, by the attestation logic of the memory die, access to a memory array of the memory die.

21. The method of claim 20, wherein remediating, by the attestation logic of the memory die, access to the memory array of the memory die comprises:
obtaining a remediation signal regarding a failed verification of the registration certificate; and
accessing, via the attestation logic of the memory die, I/O control of the memory die or control logic of the memory die to debug the failed verification of the registration certificate.

22. The method of claim 20, wherein remediating, by the attestation logic of the memory die, access to the memory array of the memory die comprises:
providing, by attestation logic of the memory die, a control signal to control logic of the memory die; and
controlling, by the control logic of the memory die, power to control logic of the memory die to prevent access to the memory array.

23. The method of claim 19, wherein the computing device coupled to the memory die comprises a drone, a smartphone, an Internet of Things (IoT) device, a memory device implemented on a vehicle, a memory device implemented in a data center, or combinations thereof.

* * * * *